US012407762B2

(12) United States Patent
Dutra et al.

(10) Patent No.: US 12,407,762 B2
(45) Date of Patent: Sep. 2, 2025

(54) AUTOMATED DEPRECATION ANALYSIS IN A SERVICE-ORIENTED SYSTEM

(71) Applicant: Amazon Technologies, Inc., Seattle, WA (US)

(72) Inventors: Bruno Cabral de Oliveira Dutra, Berlin (DE); Paul Bouche, Berlin (DE); Miguel Berkoff, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 104 days.

(21) Appl. No.: 18/160,940

(22) Filed: Jan. 27, 2023

(65) Prior Publication Data

US 2023/0171325 A1    Jun. 1, 2023

Related U.S. Application Data

(63) Continuation of application No. 16/914,110, filed on Jun. 26, 2020, now Pat. No. 11,570,261.

(51) Int. Cl.
*H04L 67/51* (2022.01)
*G06F 11/36* (2025.01)
*G06F 11/362* (2025.01)
*G06N 20/00* (2019.01)
*H04L 67/148* (2022.01)
*H04L 67/61* (2022.01)

(52) U.S. Cl.
CPC .......... *H04L 67/51* (2022.05); *G06F 11/3636* (2013.01); *G06N 20/00* (2019.01); *H04L 67/148* (2013.01); *H04L 67/61* (2022.05)

(58) Field of Classification Search
None
See application file for complete search history.

(56) References Cited

U.S. PATENT DOCUMENTS

| | | | |
|---|---|---|---|
| 8,510,729 B2 | 8/2013 | Weissman et al. | |
| 9,348,582 B2 | 5/2016 | Pillgram-Larsen et al. | |
| 9,354,865 B2 | 5/2016 | Fiebig et al. | |
| 9,436,444 B2 | 9/2016 | Hightower et al. | |
| 10,310,850 B2 | 6/2019 | Duppenthaler et al. | |
| 10,503,495 B2 | 12/2019 | Kolhe et al. | |
| 10,671,383 B2 | 6/2020 | Hegarty et al. | |
| 11,570,261 B1 | 1/2023 | Dutra et al. | |
| 2010/0299663 A1 | 11/2010 | Weissman et al. | |
| 2015/0143355 A1* | 5/2015 | Tingstrom | H04L 67/10 717/170 |
| 2016/0042068 A1* | 2/2016 | Ben Jemâa | G06F 16/955 707/769 |
| 2019/0171444 A1 | 6/2019 | Hegarty et al. | |

* cited by examiner

*Primary Examiner* — William G Trost, IV
*Assistant Examiner* — Christopher P Cadorna
(74) *Attorney, Agent, or Firm* — Robert C. Kowert; Kowert, Hood, Munyon, Rankin & Goetzel, P.C.

(57) ABSTRACT

Methods, systems, and computer-readable media for automated deprecation analysis in a service-oriented system are disclosed. A service deprecation system determines that a first service in a service-oriented system calls a second service in the service-oriented system. The service deprecation system determines that the second service calls a third service in the service-oriented system. The service deprecation system determines that logic of the second service is duplicated by logic of the first service. The first service is modified to call the third service instead of the second service, and the second service is disabled or removed from the service-oriented system.

20 Claims, 10 Drawing Sheets

AUTOMATED DEPRECATION ANALYSIS IN A SERVICE-ORIENTED SYSTEM

BACKGROUND

This application is a continuation of U.S. patent application Ser. No. 16/914,110, filed Jun. 26, 2020, which is hereby incorporated by reference herein in its entirety.

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Examples of such systems include online merchants, internet service providers, corporate networks, cloud computing services, web-based hosting services, and so on. Complex systems may include many applications and services that interact with one another in varied ways. For example, a web server may receive requests for web pages and use a complex set of interrelated services to build those requested pages. Such applications may rely on a service-oriented architecture in which many services collaborate to perform complex tasks.

Figure 1:
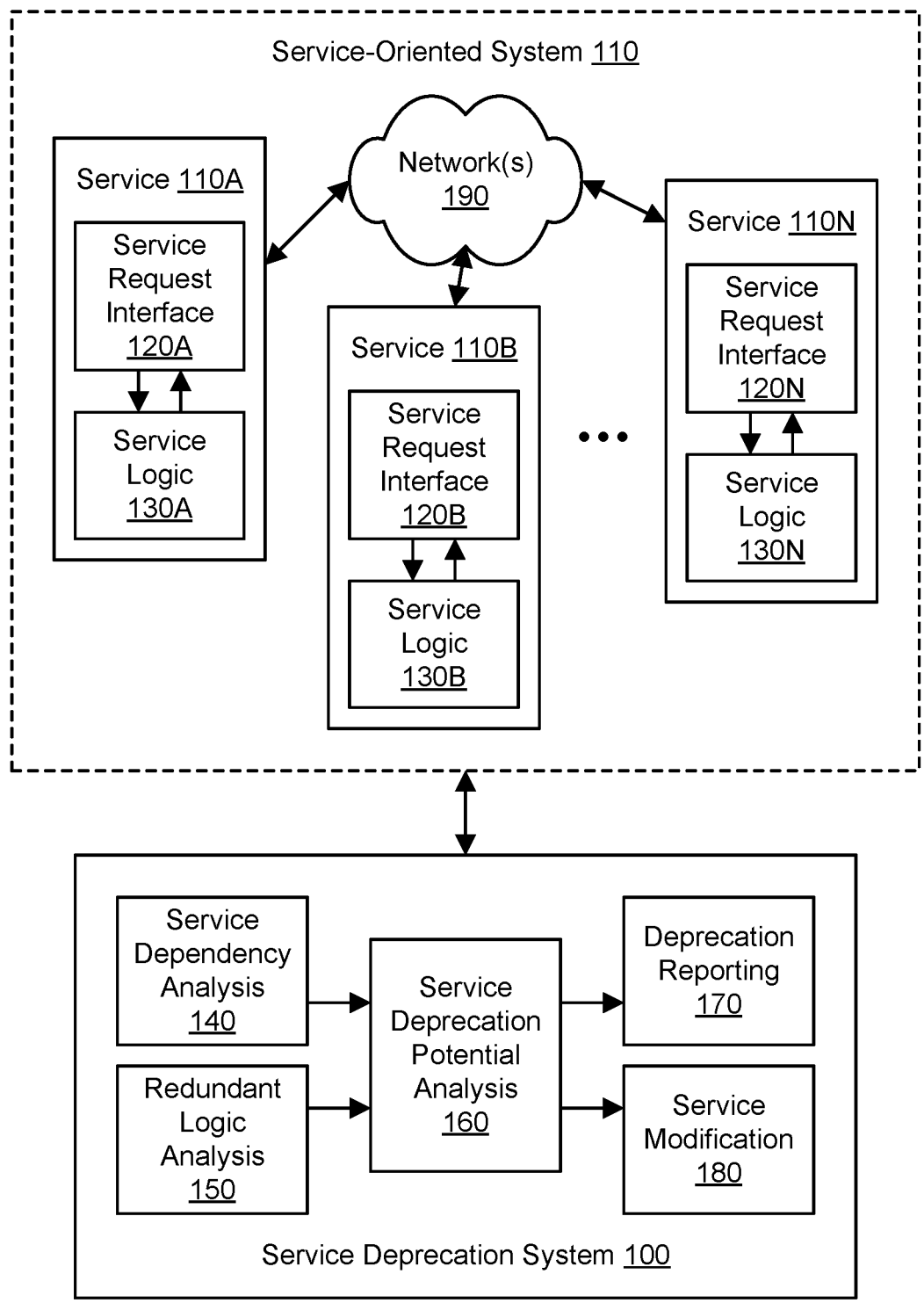
FIG. 1 illustrates an example system environment for automated deprecation analysis in a service-oriented system, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for automated deprecation analysis in a service-oriented system are described. In one embodiment, a service-oriented system includes a set of services that interact via service requests and service responses to collaborate and perform tasks. To perform a complex task, one service may call another service, that service may call yet another service, and so on. Services may be dependent on other services, and services may be part of call chains of varying complexity. The service-oriented system may be hosted by a cloud-based provider network that offers a wide variety of services and resources such as compute virtualization, storage virtualization, serverless computing, and so on. Various teams of developers may be responsible for building and supporting services in the service-oriented system. Maintenance and updating of an individual service may be time-intensive on the part of developers. For example, if the provider network includes multiple geographic regions, then migrating a service from one region to another region may be a particularly time-consuming operation. Accordingly, a greater number of services in the service-oriented system may tend to require a greater amount of time and effort to maintain, and a smaller number of services may tend to require a smaller amount of time and effort to maintain.

The aforementioned challenges, among others, are addressed by embodiments of the techniques described herein, whereby automated techniques may be used to identify duplicated logic among services and thus identify services that have potential for deprecation. Deprecation may include "retirement" of a service and replacement of that service's functionality with that of another service (or set of services). One or more forms of automated analysis may be used to identify services with deprecation potential. In some embodiments, static analysis of program code may be used to identify service dependencies, e.g., as expressed using a dependency graph. In some embodiments, runtime analysis of services may be used to identify service dependencies, e.g., by performing call tracing for service requests or other analysis of service logs. In some embodiments, duplicated logic or redundant service functionality may be determined using static analysis of program code, appropriate heuristics, machine learning techniques, and so on. For example, duplicated logic may be identified based (at least in part) on two services calling the same endpoint with the same set of input parameters. As another example, duplicated logic may be identified based (at least in part) on two services having the same or similar access patterns, including the same order of service calls to one or more additional services. Deprecation of a service with redundant logic may be associated with modification of other services. For example, if a first service calls a second service, the second service calls a third service, and logic of the first service is duplicated by the second service, then deprecation of the second service may include modification of the first service to bypass the second service and directly call the third service. Using the automated analysis of service deprecation, service maintenance may be facilitated by reducing the number of services to be maintained, updated, or migrated in a service-oriented system.

As one skilled in the art will appreciate in light of this disclosure, embodiments may be capable of achieving certain technical advantages, including some or all of the following: (1) reducing the use of computers, storage, and networks associated with maintenance of services by reducing the number of services in a service-oriented system; (2) reducing the use of computers, storage, and networks associated with the runtime operation of services by reducing the number of services in a service-oriented system; (3) reducing the use of computers, storage, and networks associated with migration of services by reducing the number of services in a service-oriented system; (4) improving the security of a service-oriented system by reducing the number of services that are potentially vulnerable to threats; (5) reducing the complexity of a service-oriented system by reducing the number of services and/or the number of service calls within the system; and so on.

FIG. 1 illustrates an example system environment for automated deprecation analysis in a service-oriented system, according to some embodiments. The example system environment may include a service deprecation system 100 and a service-oriented system 110 including a plurality of services 110A-110N. In some embodiments, the service deprecation system 100 may provide deprecation-related analysis for various types of software products or executable program code such as applications, services, components of applications, components of services, and so on. The service-oriented system 110 may implement a service-oriented architecture and may include multiple services 110A-110N configured to communicate with each other (e.g., through message passing) to carry out various tasks via one or more networks 190. Although three services 110A, 110B, and 110N are illustrated for purposes of example, it is contemplated that any suitable number and configuration of services may be used with the service-oriented system 110. One of services 110A-110N may represent an individual service host or a set of service hosts that implement the same service. The services 110A-110N may be implemented using a plurality of hosts, any of which may be implemented by the example computing device 600 illustrated in FIG. 6. The hosts may be located in any suitable number of data centers or geographical locations. In one embodiment, multiple services and/or instances of the same service may be implemented using the same host.

The service-oriented system 110 may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of processes. The services 110A-110N described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

Services 110A-110N may send service requests to other services and receive corresponding responses to those requests. A service may offer one or more application programming interfaces (APIs) or other programmatic interfaces through which another service may request the functionality of the service. As shown in the example of FIG. 1, service 110A may include service request interface 120A, service 110B may include service request interface 120B, and service 110N may include service request interface 120N. In some cases, a first service may call a second service, the second service may call a third service to satisfy the request from the first service, and so on. For example, to build a web page dynamically, numerous services may be invoked in a hierarchical manner to build various components of the web page. A service may include one or more components that may also participate in the service-oriented system 110, e.g., by passing messages to other services or to other components within the same service. In one embodiment, the service deprecation system 100 may perform deprecation analysis at the granularity of individual APIs or components of services. In one embodiment, the service deprecation system 100 may perform deprecation analysis at the granularity of individual services.

Each service 110A-110N may be configured to perform one or more functions upon receiving a suitable request via an API. These one or more functions may be referred to as the service logic or service functionality of the recipient service. As shown in the example of FIG. 1, service 110A may implement service logic 130A, service 110B may implement service logic 130B, and service 110N may implement service logic 130N. As an example of service logic, a service may be configured to retrieve input data from one or more storage locations and/or from a service request, transform or otherwise process the data, and generate output data. The different types of service logic 130A-130N may usually differ from service to service. However, in some circumstances, the service logic at one service may represent the same or equivalent logic to that of another service. For example, service logic 130A at service 110A and service logic 130B at service 110B may implement the same or similar tasks, including packaging and sending similar requests to an additional service. If all of the service logic at a service represents redundant or duplicated logic, then that service may have the potential for deprecation. In some embodiments, different sets of logic at different services may be considered redundant or duplicated if the sets of logic tend to produce the same output(s) given the same input(s).

The service deprecation system 100 may use automated analysis of the services 110A-110N to identify services with the potential for deprecation. The service deprecation system 100 may include a component for service dependency analysis 140. The service dependency analysis 140 may analyze the services 110A-110N to determine dependency relationships among the services. A first service may be dependent on a second service if the first service calls the second service. The service dependency analysis 140 may generate or obtain one or more dependency graphs indicative of dependencies among the services 110A-110N. A dependency graph may include a plurality of nodes representing services or service APIs and edges representing calls from service (or API) to service (or API). An example of a dependency graph is shown in FIG. 2. In some embodiments, the service dependency analysis 140 may use static analysis of program code of services 110A-110N to identify dependencies. For example, if the program code for service 110B indicates that service 110B makes a call to service 110N, then the service dependency analysis 140 may identify a dependency of service 110B on service 110N. In some embodiments, the service dependency analysis 140 may use runtime analysis of services 110A-110N to identify dependencies. For example, trace headers may be embedded in service requests, and the flow of a particular trace header from service to service may be used to identify call chains and dependency relationships.

The service deprecation system 100 may include a component for redundant logic analysis 150. The redundant logic analysis 150 may determine one or more indicators of redundant or duplicated logic among different services. Redundant or duplicated logic may tend to achieve the same results for the same inputs even though the underlying program code or even programming languages may differ. In one embodiment, indicators of redundant or duplicated logic may be determined using static analysis of program code. In one embodiment, the redundant logic analysis 150 may use results of the service dependency analysis 140. For example, duplicated logic may be identified based (at least in part) on two services calling the same endpoint with the same set of input parameters in their program code. As another example, duplicated logic may be identified based (at least in part) on two services having the same or similar access patterns in their program code, including the same order of service calls to one or more additional services. In one embodiment, appropriate heuristics may be applied to program code of services 110A-110N to find operations that are equivalent or that tend to produce the same output for a given set of inputs. In one embodiment, to identify sets of logic that are functionally equivalent despite one or more of the sets of logic relying a cache to store results from another service, the static analysis may search for data structures that represent such caches. For example, the static analysis may search the program code for proxy classes, e.g., classes that have "proxy" in their names or some other nomenclature that indicates use of a cache.

In one embodiment, appropriate machine learning techniques may be applied to program code of services 110A-110N to find operations that are equivalent or that tend to produce the same output. For example, a neural network may be trained with pairs of known redundant logic in order to identify redundant logic not found in the training set. Machine learning techniques may be implemented using one or more systems that learn from data, identify patterns, and make predictions or other decisions with minimal human intervention (e.g., after human input during an initial configuration phase such as model training). Machine learning may include generating and using one or more models that can programmatically output results (e.g., indicators of redundant logic) based (at least in part) on input (e.g., the logic itself and/or dependency relationships associated with the logic). Such a model may undergo a training process (e.g., using a training data set) such that it learns patterns sufficient to make inferences about future events.

In some embodiments, indicators of duplicated logic or redundant service functionality may be identified by the service deprecation system 100 using automated analysis of software design diagrams associated with services. Users may employ a software design diagrammer to create and edit design diagrams for services or other software products. The design diagrammer may be configured to generate design diagrams associated with software products and components of software products. Software products may include executable program code such as applications, services, components of applications, components of services, and so on. The terms "application" and "service" may be used interchangeably herein. Components of software products may include executable programs (e.g., applications, services, packages, and so on), configurations of programs, storage resources (e.g., as managed by network-accessible storage services), configurations of storage resources, database tables, execution environments, hosts or other computing devices, network devices (e.g., routers and load balancers), network entities (e.g., virtual private clouds), abstractions such as host classes, containers, tasks submitted to program execution services, other network-accessible services, and so on. Design diagrams may represent such components and their relationships as design elements. Design diagrams may include architecture diagrams, dataflow diagrams, sequence diagrams, class diagrams, state machine diagrams, use case diagrams, and so on. In some embodiments, the design diagrammer may implement a graphical user interface (GUI) by which users may add components and relationships, edit components and relationships, delete components and relationships, select generic component types for inclusion in diagrams, customize generic component types, specify security properties of components, and so on. In some embodiments, design diagrams may be provided to the service deprecation system 100 via another interface, e.g., via an application programming interface (API) by a client that represents another system or service.

The dependency information (e.g., one or more dependency graphs) and indicators of redundant logic may be used as input to analysis of service deprecation potential 160 performed by the system 100. Using results of the service dependency analysis 140 and results of the redundant logic analysis 150, the service deprecation potential analysis 160 may identify one or more services or APIs that have redundant logic and could potentially be removed from the service-oriented system 110. For example, service logic 130A at service 110A and service logic 130B at service 110B may implement the same or similar tasks, including packaging and sending similar requests to an additional service. In one embodiment, if all of the service logic at service 110B represents redundant or duplicated logic, then that service 110B may have the potential for deprecation. In one embodiment, if a call chain can be routed around service 110B and achieve the same results as before, then that service 110B may have the potential for deprecation.

The service deprecation system 100 may include a component for deprecation reporting 170. Deprecation reporting 170 may generate one or more reports, messages, or other human-readable data descriptive of services found to have deprecation potential. For example, if service 110B is found to have deprecation potential, then the deprecation reporting 170 may name the service 110B, describe the logic 130B that is deemed redundant, describe the relationships of service 110B to other services, and so on. In some embodiments, deprecation potential of services or service logic may be reported using different levels of priority or severity. In some embodiments, deprecation potential of services or service logic may be reported using different confidence levels. For example, if machine learning techniques are used in the service deprecation potential analysis 160, then the machine learning techniques may output confidence scores (e.g., low, medium, high) associated with findings of deprecation potential.

Based (at least in part) on the deprecation reporting 170, a developer or team of developers may choose to deprecate a service. Deprecation of a service may include "retirement" or "decommissioning" of that service. Deprecation of a service may include reassigning responsibilities of the deprecated service to one or more other services. Deprecation of a service may include routing a call chain around the deprecated service and achieving the same results as before deprecation. Deprecation of a service may include keeping the deprecated service in production but encouraging clients of the service to use one or more other services instead of the deprecated service to provide equivalent functionality. Deprecation of a service may include eventual removal of the service from the service-oriented system 100 or otherwise disabling the service such that it is prevented from taking new requests. In some embodiments, the deprecated service may be removed only after the service has ceased to receive requests from clients over a period of time. In some embodiments, one or more aspects of deprecation may be performed manually by developers or owners associated with services. In some embodiments, one or more aspects of deprecation may be performed automatically by the system 100, potentially after seeking approval from developers or owners associated with services.

The service deprecation system 100 may include a component for service modification 180. Deprecation of a service with redundant logic may be associated with modification of other services. For example, if service 110A calls service 110B, service 110B calls service 110N, and logic 130A of service 110A is duplicated by the logic 130B of service 110B, then deprecation of the service 110B may include modification of the service 110A to bypass the service 110B and directly call the service 110N. In some embodiments, one or more aspects of service modification 180 may be performed manually by developers or owners associated with services. In some embodiments, one or more aspects of service modification 180 may be performed automatically by the system 100, potentially after seeking approval from developers or owners associated with services.

In some embodiments, the system 100 and/or service 110A-110N may be implemented using resources of a provider network. In one embodiment, the provider network may include numerous data centers hosting various resource pools, such as collections of physical and/or virtualized computer servers, storage devices, and networking equipment that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. In one embodiment, an operator of the provider network may implement a flexible set of resource reservation, control, and access interfaces for clients. For example, a provider network may implement a programmatic resource reservation interface (e.g., via a web site or a set of web pages) that allows clients to learn about, select, purchase access to, and/or reserve resources. The provider network may be hosted in the cloud and may be termed a cloud provider network. The provider network may offer multi-tenancy using its various resources pools and may be termed a multi-tenant provider network.

In some embodiments, the service deprecation system 100 may be offered as a service to clients of the provider network. Clients of the service deprecation system 100 may represent users who seek to identify services with deprecation potential within their service-oriented systems. The clients may represent internal entities (e.g., developers of services offered by the provider network) or external entities (e.g., clients that operate their own service-oriented systems apart from the provider network). To enable clients to invoke its functionality, the system 100 may expose any suitable interface(s), such as one or more APIs or other programmatic interfaces and/or graphical user interfaces (GUIs). In one embodiment, the functionality of the system 100 may be offered to clients in exchange for fees.

In some embodiments, client computing devices may convey network-based service requests to the system 100 via one or more networks 190. In various embodiments, the network(s) 190 may encompass any suitable combination of networking hardware and protocols necessary to establish network-based communications between the client and the system 100. For example, the network(s) 190 may generally encompass the various telecommunications networks and service providers that collectively implement the Internet. The network(s) may also include private networks such as local area networks (LANs) or wide area networks (WANs) as well as public or private wireless networks. For example, both the client and the system 100 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between the client and the Internet as well as between the Internet and the system 100. It is noted that in some embodiments, the client may communicate with the system 100 using a private network rather than the public Internet.

Figure 6:
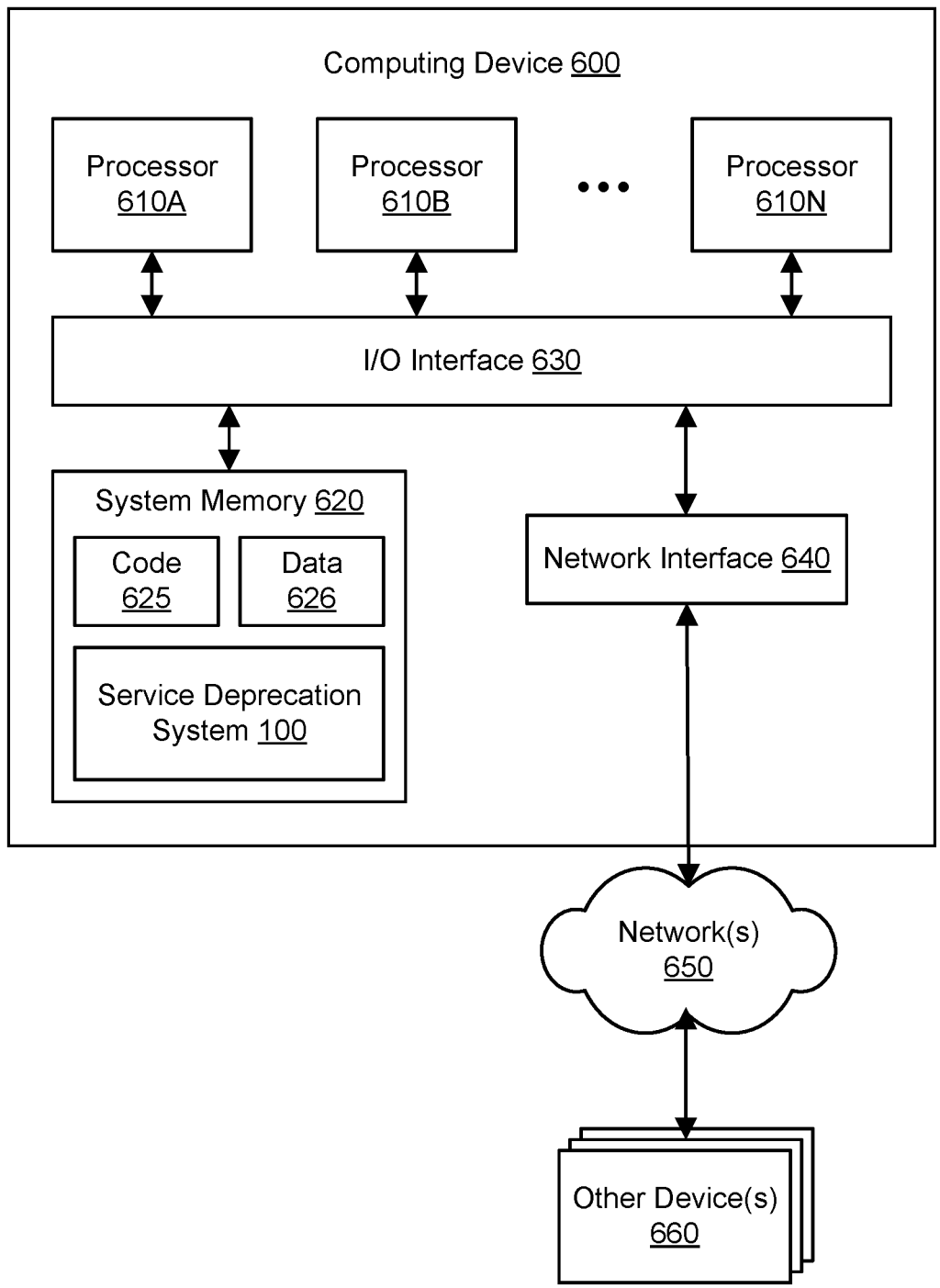
FIG. 6 illustrates an example computing device that may be used in some embodiments.

The service deprecation system 100 and the service-oriented system 110 may be implemented using any suitable number and configuration of computing devices, any of which may be implemented by the example computing device 600 illustrated in FIG. 6. The computing devices may be located in any suitable number of data centers or geographical locations. In various embodiments, at least some of the functionality of the service deprecation system 100 may be provided by the same computing device or by different computing devices. If any of the components of the service deprecation system 100 are implemented using different computing devices, then the components and their respective computing devices may be communicatively coupled, e.g., via one or more networks. Each of the components of the service deprecation system 100 may represent any combination of software and hardware usable to perform their respective functions. It is contemplated that service deprecation system 100 and/or the service-oriented system 110 may include additional components not shown, fewer components than shown, or different combinations, configurations, or quantities of the components shown.

Operations implemented by the service deprecation system 100 may be performed automatically, e.g., without a need for user initiation or user intervention after an initial configuration stage, and programmatically, e.g., by execution of program instructions on at least one computing device without direct user intervention to collect and/or analyze service dependencies and indicators of logic duplication. In one embodiment, aspects of the service deprecation system 100 may be performed continuously and/or repeatedly, e.g., to adapt to changing conditions in the service-oriented system 110. For example, a dependency graph involving a particular set of services may be kept up to date based on the latest service call traces, e.g., by revising the dependency graph periodically. As another example, indicators of duplicated service logic for a particular service may be updated when the program code for the service is updated. In one embodiment, the service deprecation system 100 may be used in a deployment pipeline for new software (including new versions of software) such that deprecation potential (including that of older services) is determined based on the latest version of the program code.

Figure 2A:
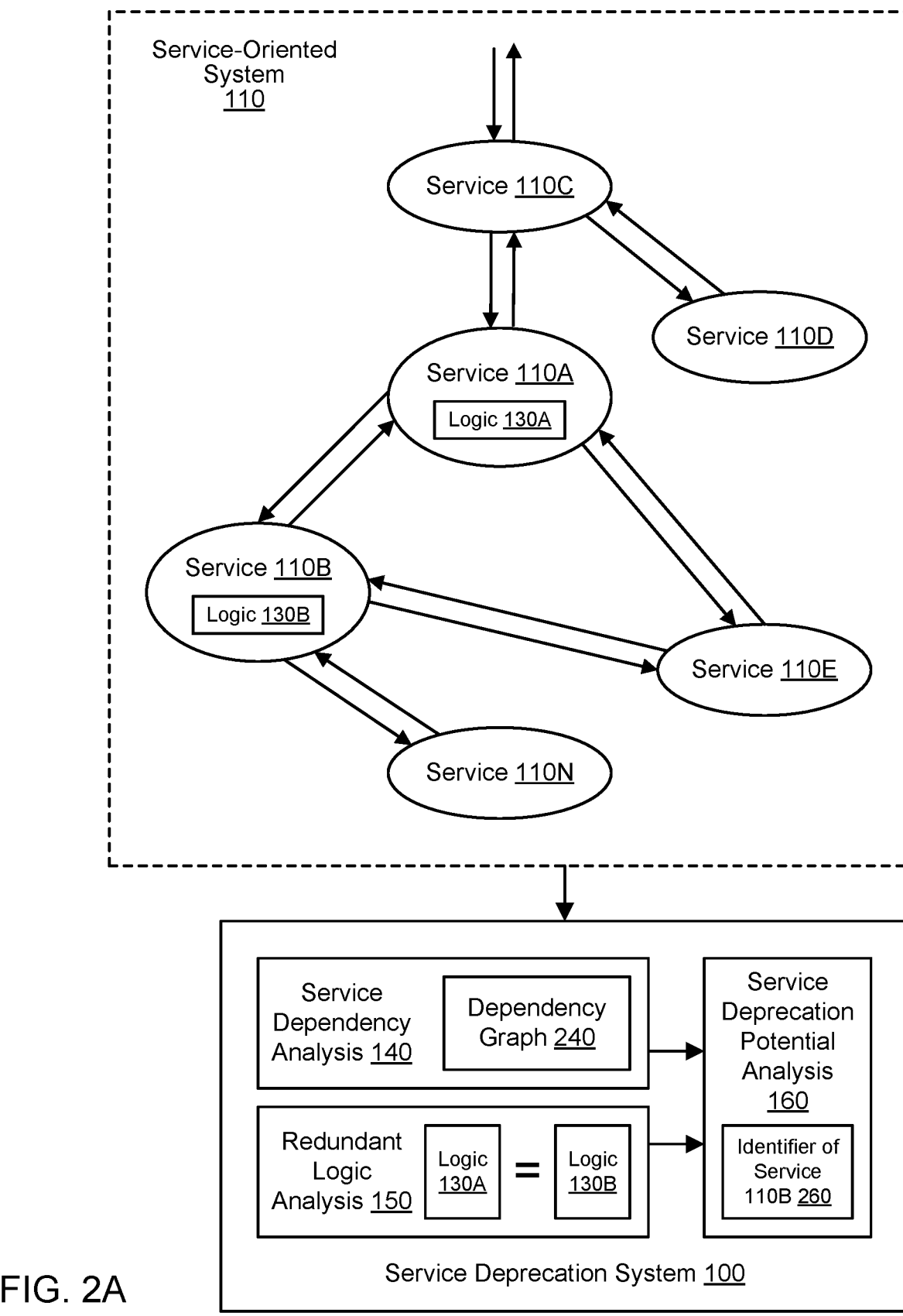
FIG. 2A and FIG. 2B illustrate further aspects of the example system environment for automated deprecation analysis in a service-oriented system, including an example of deprecation analysis with service logic duplicated by two services, according to some embodiments.
Figure 2B:
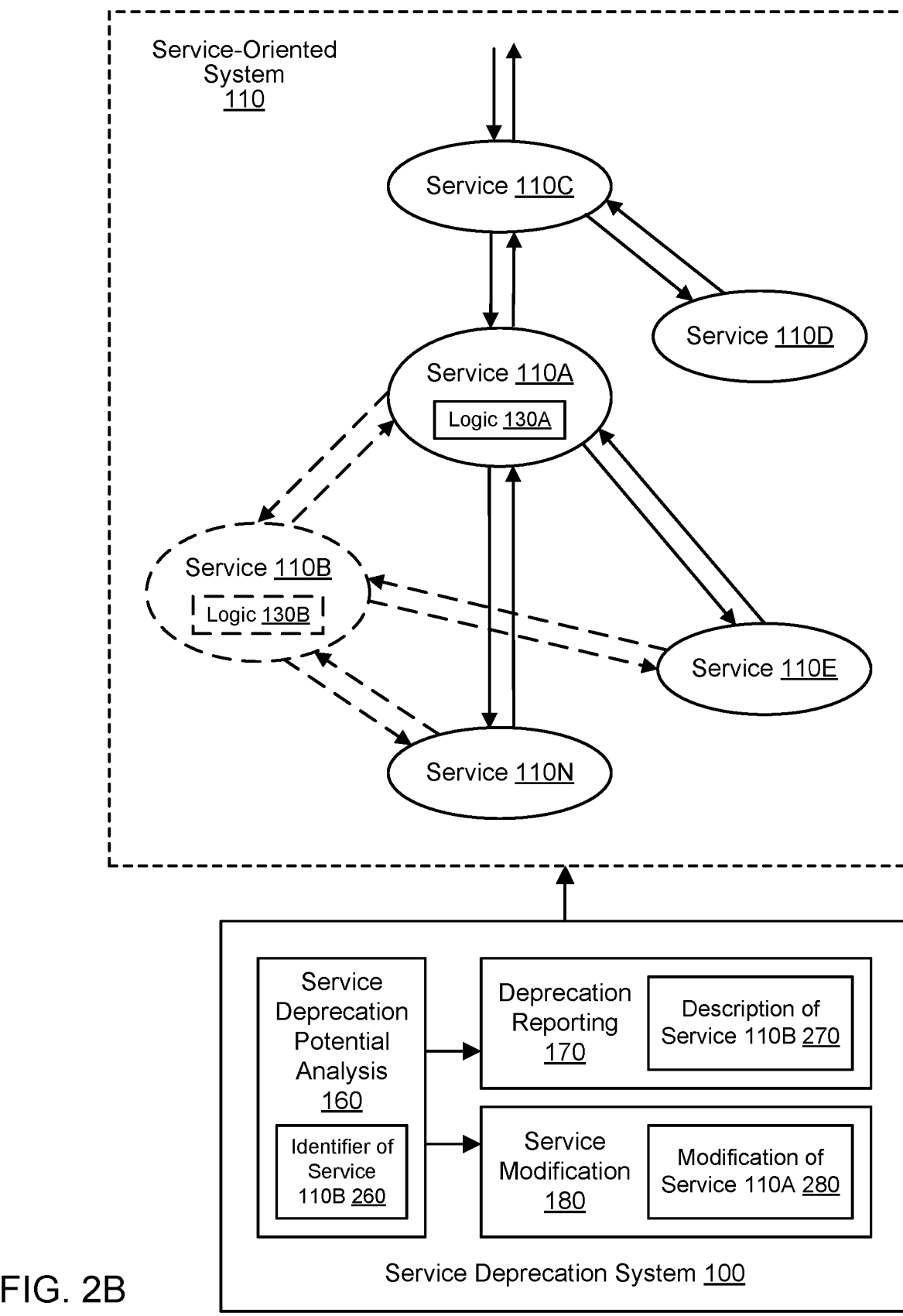

FIG. 2A and FIG. 2B illustrate further aspects of the example system environment for automated deprecation analysis in a service-oriented system, including an example of deprecation analysis with service logic duplicated by two services, according to some embodiments. As discussed above, services may collaborate to perform tasks by sending requests to other services, e.g., along various routes. A route may correspond to a set of call paths between services or APIs. The call paths may represent inbound service requests and outbound service requests relative to a particular service or API. To process a given received request, one or more services may be invoked. As used herein, an initial request may be referred to as the "root request." In various embodiments, the root request may but need not originate from a computer system outside of the service-oriented system 110. In many embodiments, a root request may be processed by an initial service, which may then call APIs of one or more other services. Additionally, each of those services may also call APIs of one or more other services, and so on until the root request is completely fulfilled. The particular services or APIs called to fulfill a request may be represented as a call graph that specifies, for each particular service or API of multiple services or APIs called to fulfill the same root request, the service or API that called the particular service or API and any services or APIs called by the particular service or API.

From the perspective of a particular service, any service that calls the particular service may be referred to as a "parent service." Furthermore, from the perspective of a particular service, any service that the particular service calls may be referred to as a "child service." In a similar fashion, from the perspective of a particular request, any request from which the particular request stems may be referred to as a "parent request." Furthermore, from the perspective of a particular request, any request stemming from the particular request may be referred to as a "child request." Additionally, as used herein the phrases "request," "call," "service request" and "service call" may be used interchangeably. A request to a service may represent a request to an API of that service. Note that this terminology refers to the nature of the propagation of a particular request throughout the present system and is not intended to limit the physical configuration of the services.

Call graphs or dependency graphs may be built by the service deprecation system 100 or obtained from another service by the service deprecation system. In various embodiments, forms of automated analysis including static analysis, runtime analysis, and/or a combination thereof may be used to determine dependencies between services in the service-oriented system 110. In some embodiments, program code of services may be analyzed to determine which services call which other services. In some embodiments, trace headers may be added to runtime service calls (e.g., beginning with a sample of root requests) in order to identify dependencies among services as services call other services and include the trace headers.

An example hierarchy of call paths in a dependency graph is illustrated in FIG. 2A. In one embodiment, an initial request to an upstream service may take a route through numerous downstream services in the service-oriented system 110 in order to satisfy a particular initial request. The route may correspond to one or more call paths between services. The call paths may represent inbound service requests and outbound service requests relative to a particular service. To process a given received request, one or more services may be invoked. As used herein, an initial request may be referred to as the "root request." In various embodiments, the root request may but need not originate from a computer system outside of the service-oriented system 110. In many embodiments, a root request may be processed by an initial service such as service 110C, which may then call one or more other services such as service 110A and service 110D. Additionally, each of those services may also call one or more other services, and so on until the root request is completely fulfilled.

The particular services called to fulfill a request may correspond to a dependency graph that includes, for each particular service of multiple services called to fulfill the same root request, the service that called the particular service and any services called by the particular service. In the example call graph of FIG. 2A, the root request may be provided to a service 110C, which may then call a downstream service 110A and another downstream service 110D to satisfy that root request. The service 110A may then call additional downstream services 110B and 110E and potentially wait for responses from those services before responding to the request from the upstream service 110C. Similarly, the service 110B may call additional downstream services 110E and 110N and potentially wait for responses from those services before responding to the request from the upstream service 110A. Ultimately the service 110C may provide a response to the requesting entity based on a flow of responses from downstream services. For example, if the root request represents a request to view a product detail page in an online marketplace, then the various downstream services 110A, 110D, 110B, 110E, and 110N may collaborate to build that page dynamically, and the service 110C may then provide the page to the client that issued the root request.

The service dependency analysis 140 may generate or obtain one or more dependency graphs 240 indicative of dependencies among the services 110A-110N as shown in FIG. 2A. The redundant logic analysis 150 may determine one or more indicators of redundant or duplicated logic among different services. As shown in FIG. 2A, the redundant logic analysis 150 may determine that logic 130A of service 110A is equivalent to logic 130B of service 110B. For example, duplicated logic 130A and 130B may be identified based (at least in part) on two services 110A and 110B calling the same endpoint of service 110E with the same set of input parameters in their program code. As another example, duplicated logic 130A and 130B may be identified based (at least in part) on two services 110A and 110B having the same or similar access patterns in their program code, including the same order of service calls to service 110E.

Using results of the service dependency analysis 140 and results of the redundant logic analysis 150, the service deprecation potential analysis 160 may determine identifiers of one or more services or APIs that have redundant logic and could potentially be removed from the service-oriented system 110. For example, service logic 130A at service 110A and service logic 130B at service 110B may implement the same or similar tasks, including packaging and sending similar requests to an additional service 110E. As shown in FIG. 2A, the service deprecation potential analysis 160 may determine an identifier (e.g., a service name and/or other identifying metadata) 260 of the service 110B that has deprecation potential. In one embodiment, if all of the service logic 130B at service 110B represents redundant or duplicated logic, then that service 110B may have the potential for deprecation. In one embodiment, if a call chain can be routed around service 110B and achieve the same results as before, then that service 110B may have the potential for deprecation.

As shown in FIG. 2B, deprecation reporting 170 may generate one or more reports, messages, or other human-readable data 270 descriptive of the service 110B found to have deprecation potential. Based (at least in part) on the deprecation reporting 170, one or more developers or service owners may choose to deprecate the service 110B. Deprecation of the service 110B may include "retirement" of that service. Deprecation of the service 110B may include reassigning responsibilities of the deprecated service to one or more other services. Deprecation of the service 110B may include routing a call chain around the deprecated service and achieving the same results as before deprecation. Deprecation of the service 110B may include keeping the deprecated service in production but encouraging clients of the service to use other services instead of the deprecated service. Deprecation of the service 110B may include eventual removal of the service from the service-oriented system 100. For example, the deprecated service may be removed only after the service has ceased to receive requests from clients over a period of time.

Deprecation of the service 110B may be associated with modification 280 of one or more other services such as service 110A. For example, if service 110A calls service 110B, service 110B calls service 110N, and logic 130A of service 110A is duplicated by the logic 130B of service 110B, then deprecation of the service 110B may include modification of the service 110A to bypass the service 110B and directly call the service 110N. In some embodiments, one or more aspects of service modification 280 of service 110A may be performed manually by developers or owners associated with services. In some embodiments, one or more aspects of service modification 280 of service 110A may be performed automatically by the system 100, potentially after seeking approval from developers or owners associated with services.

Figure 3:
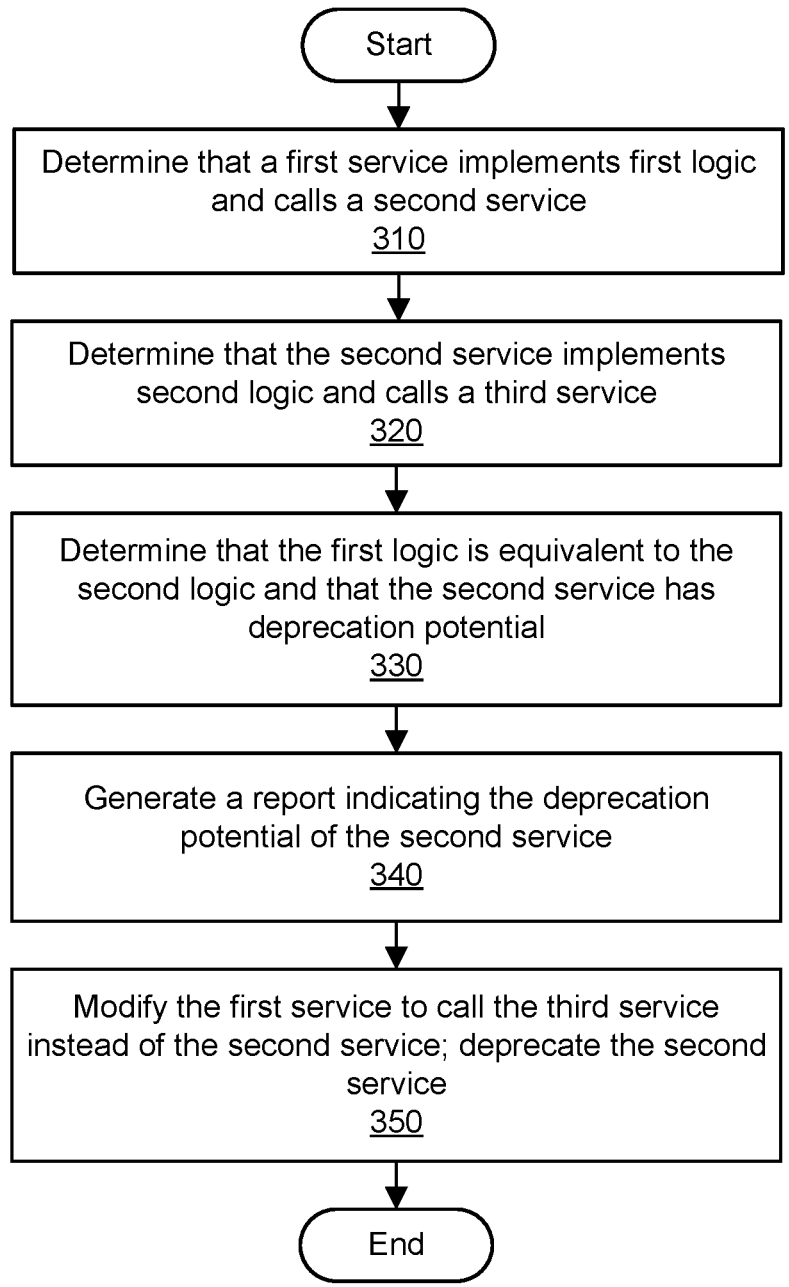
FIG. 3 is a flowchart illustrating a method for automated deprecation analysis in a service-oriented system, according to some embodiments.

FIG. 3 is a flowchart illustrating a method for automated deprecation analysis in a service-oriented system, according to some embodiments. As shown in 310, a service deprecation system may determine that a first service implements a first set of service logic and that the first service calls a second service. As shown in 320, the service deprecation system may determine that the second service implements a second set of service logic and that the second service calls a third service. Static analysis of program code may be used to identify the service logic implemented by the first and second services. Service dependency analysis may analyze a set of services (including the first, second, and third services) to determine dependency relationships among the services. For example, a dependency graph may include a plurality of nodes representing services or service APIs and edges representing calls from service (or API) to service (or API). In some embodiments, the service dependency analysis may use static analysis of program code of services to identify dependencies. For example, if the program code for the second service indicates that the service makes a call to the third service, then the service dependency analysis may identify a dependency of the second service on the third service. In some embodiments, the service dependency analysis may use runtime analysis of services to identify dependencies. For example, trace headers may be embedded in service requests, and the flow of a particular trace header from service to service may be used to identify call chains and dependency relationships.

As shown in 330, the service deprecation system may determine that the first set of service logic is equivalent to the second set of service logic and thus that the second service has deprecation potential. Redundant logic analysis may determine one or more indicators of redundant, duplicated, or equivalent logic among different services. Redundant, duplicated, or equivalent logic may tend to achieve the same results even though the underlying program code or even programming languages may differ. In one embodiment, indicators of redundant, duplicated, or equivalent logic may be determined using static analysis of program code. For example, equivalent logic may be identified based (at least in part) on the first and second services calling the same endpoint with the same set of input parameters in their program code. As another example, equivalent logic may be identified based (at least in part) on the first and second services having the same or similar access patterns in their program code, including the same order of service calls to one or more additional services. In one embodiment, if all of the service logic at the second service represents redundant or duplicated logic, then that service may have the potential for deprecation. In one embodiment, if a call chain can be routed around the second service (e.g., by having the first service call the third service directly) and achieve the same results as before, then that service may have the potential for deprecation.

As shown in 340, the service deprecation system may generate a report indicating the deprecation potential of the second service. Deprecation reporting may generate one or more reports, messages, or other human-readable data descriptive of services found to have deprecation potential. For example, if the second service is found to have deprecation potential, then the deprecation reporting may name the service, describe the service logic that is deemed redundant, describe the relationships of the service to other services, and so on. Based (at least in part) on the deprecation reporting, one or more developers or service owners may choose to deprecate the second service.

As shown in 350, the first service may be modified to call the third service instead of the second service. The second service may be deprecated. Deprecation of the second service may include "retirement" of that service. Deprecation of the second service may include reassigning responsibilities of the deprecated service to one or more other services, such as the first service. Deprecation of the second service may include routing a call chain around the deprecated service and achieving the same results as before deprecation. Deprecation of the second service may include keeping the deprecated service in production but encouraging clients of the service to use other services (such as the first service) instead of the deprecated service. Deprecation of the second service may include eventual removal of the service from the service-oriented system. For example, the second service may be removed only after the service has ceased to receive requests from clients over a period of time. In some embodiments, one or more aspects of deprecation and/or service modification may be performed manually by developers or owners associated with services. In some embodiments, one or more aspects of deprecation and/or service modification may be performed automatically by a service deprecation system, potentially after seeking approval from developers or owners associated with services.

Figure 4A:
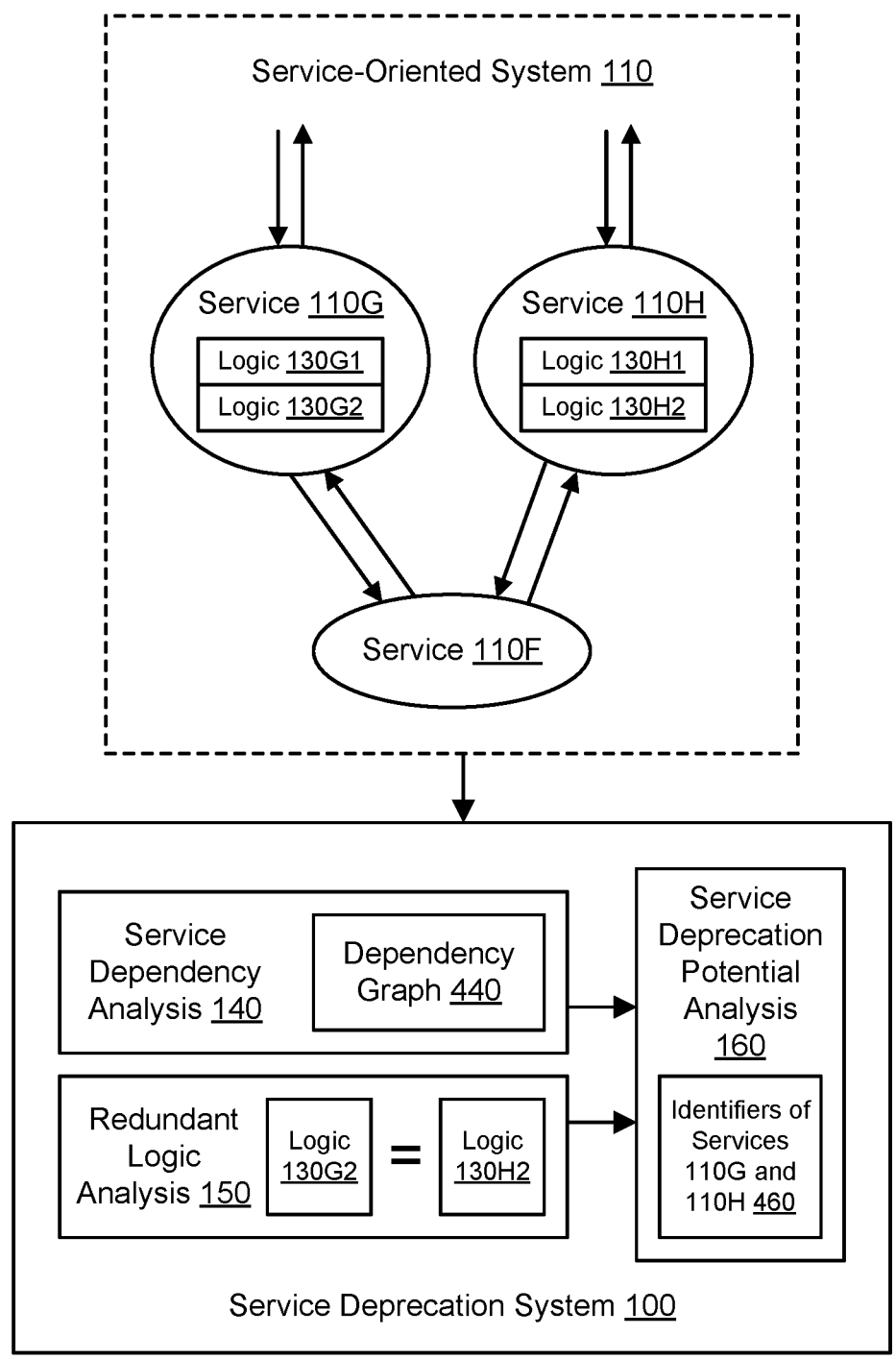
FIG. 4A and FIG. 4B illustrate further aspects of the example system environment for automated deprecation analysis in a service-oriented system, including an example of deprecation analysis with service logic duplicated by two different services that both call a downstream service, according to some embodiments.
Figure 4B:
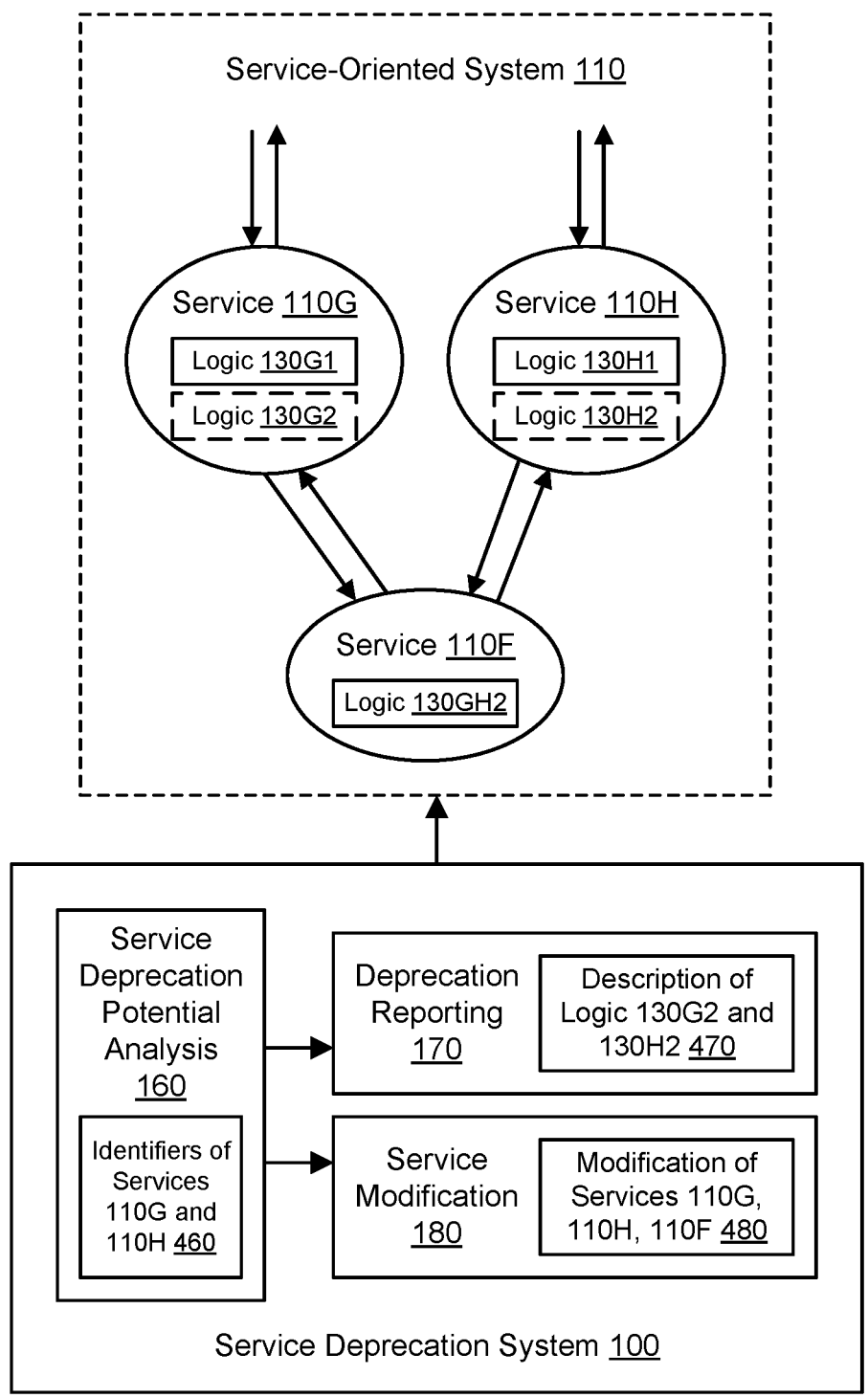

FIG. 4A and FIG. 4B illustrate further aspects of the example system environment for automated deprecation analysis in a service-oriented system, including an example of deprecation analysis with service logic duplicated by two different services that both call a downstream service, according to some embodiments. In the example call graph of FIG. 4A, a request may be provided to a service 110G, which may then call a downstream service 110F. Similarly, a request may be provided to a service 110H, which may then call the same downstream service 110F. The calls from the service 110G and service 110H may represent similar access patterns, e.g., by calling the same API with the same input parameters and potentially in the same order with respect to other calls or operations. In some embodiments, many such services may call the downstream service 110A using similar access patterns.

The service dependency analysis 140 may generate or obtain one or more dependency graphs 440 indicative of dependencies among the services 110F-110H as shown in FIG. 4A. The redundant logic analysis 150 may determine one or more indicators of redundant or duplicated logic among different services. As shown in FIG. 4A, the redundant logic analysis 150 may determine that logic 130G2 of service 110G is equivalent to logic 130H2 of service 110H. However, logic 130G1 and logic 130H1 may not be equivalent. In one embodiment, duplicated logic 130G2 and 130H2 may be identified based (at least in part) on two services 110G and 110H calling the same endpoint of service 110F with the same set of input parameters in their program code. In one embodiment, duplicated logic 130G2 and 130H2 may be identified based (at least in part) on two services 110G and 110H having the same or similar access patterns in their program code, including the same order of service calls to service 110F.

Using results of the service dependency analysis 140 and results of the redundant logic analysis 150, the service deprecation potential analysis 160 may determine identifiers of one or more services or APIs that have redundant logic that could potentially be removed from the service-oriented system 110. For example, service logic 130G2 at service 110G and service logic 130H2 at service 110H may implement the same or similar tasks, including packaging and sending similar requests to service 110F. As shown in FIG. 4A, the service deprecation potential analysis 160 may determine identifiers (e.g., service names and/or other identifying metadata) 460 of the services 110G and 110H that have deprecation potential.

As shown in FIG. 4B, deprecation reporting 170 may generate one or more reports, messages, or other human-readable data 470 descriptive of the service logic 130G2 and 130H2 found to have deprecation potential. Based (at least in part) on the deprecation reporting 170, one or more developers or service owners may choose to deprecate the service logic 130G2 and 130H2 in services 110G and 110H and instead implement equivalent logic 130GH2 in the service 110F. By moving the logic into the service 110F, the service-oriented system 100 may be simplified such that maintenance of the services 110F-110H consumes less developer time and fewer resources, particularly if equivalent logic is found in additional services beyond services 110G and 110H. Deprecation of the service logic 130G2 and 130H2 may represent a partial "retirement" of the corresponding services 110G and 110H. Deprecation of the service logic 130G2 and 130H2 may include reassigning responsibilities of the deprecated logic to one or more other services such as service 110F. Deprecation of the service logic 130G2 and 130H2 may include keeping deprecated versions of the services 110G and 110H in production but encouraging clients of the service to use newer versions of those services instead of the deprecated versions. Deprecation of the service logic 130G2 and 130H2 may include eventual removal of the deprecated versions of the services from the service-oriented system 100.

Deprecation of the service logic 130G2 and 130H2 may be associated with modification 480 of one or more services such as services 110F, 110G, and 110H. As shown in the example of FIG. 4B, service 110F may be modified such that it implements service logic 130GH2 that is functionally equivalent to logic 130G2 and 130H2. In some embodiments, service logic 130GH2 may be implemented using a new interface (e.g., a new API) by service 110F. Service 110G may be modified to remove logic 130G2 and instead rely on equivalent logic 130GH2 in the downstream service 110F. Similarly, service 110H may be modified to remove logic 130H2 and instead rely on equivalent logic 130GH2 in the downstream service 110F. In some embodiments, one or more aspects of service modification 480 of may be performed manually by developers or owners associated with services. In some embodiments, one or more aspects of service modification 480 may be performed automatically by the system 100, potentially after seeking approval from developers or owners associated with services. In some embodiments, service logic 130GH2 may be removed from service 110G and 110H and implemented using an external service instead of using service 110F.

Figure 5A:
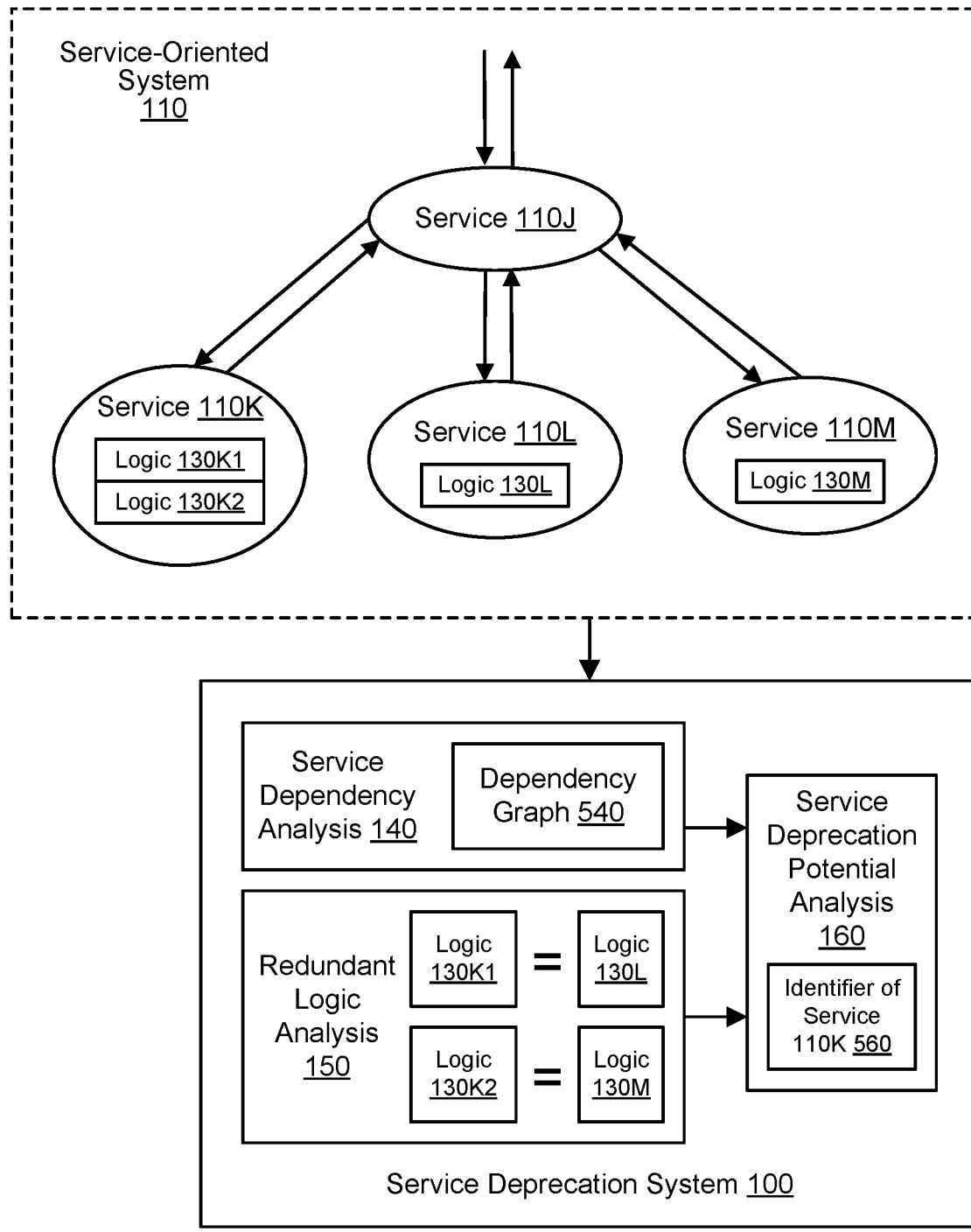
FIG. 5A, FIG. 5B, and FIG. 5C illustrate further aspects of the example system environment for automated deprecation analysis in a service-oriented system, including an example of deprecation analysis with service logic of a single service duplicated collectively by two other services, according to some embodiments.
Figure 5B:
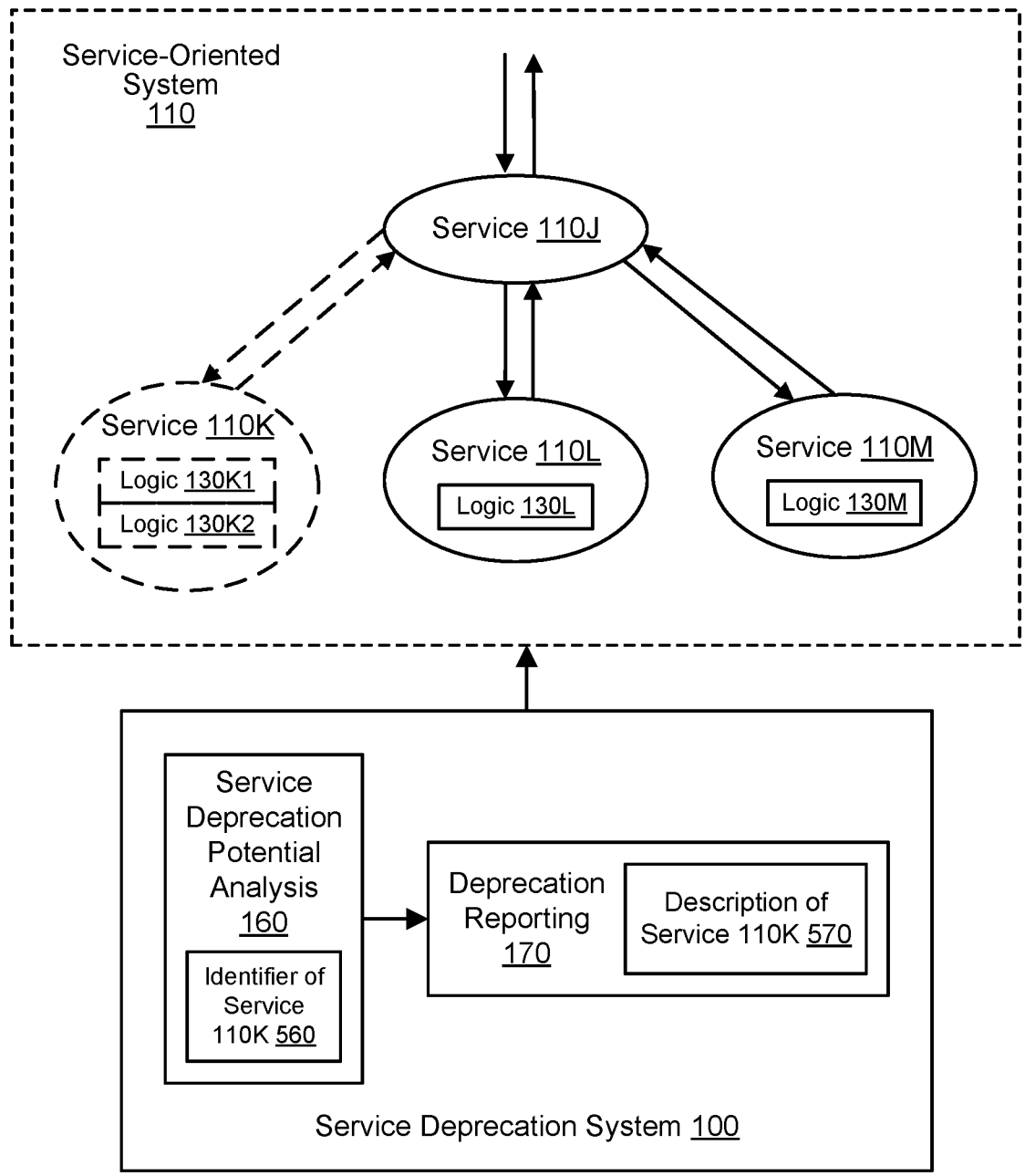
Figure 5C:
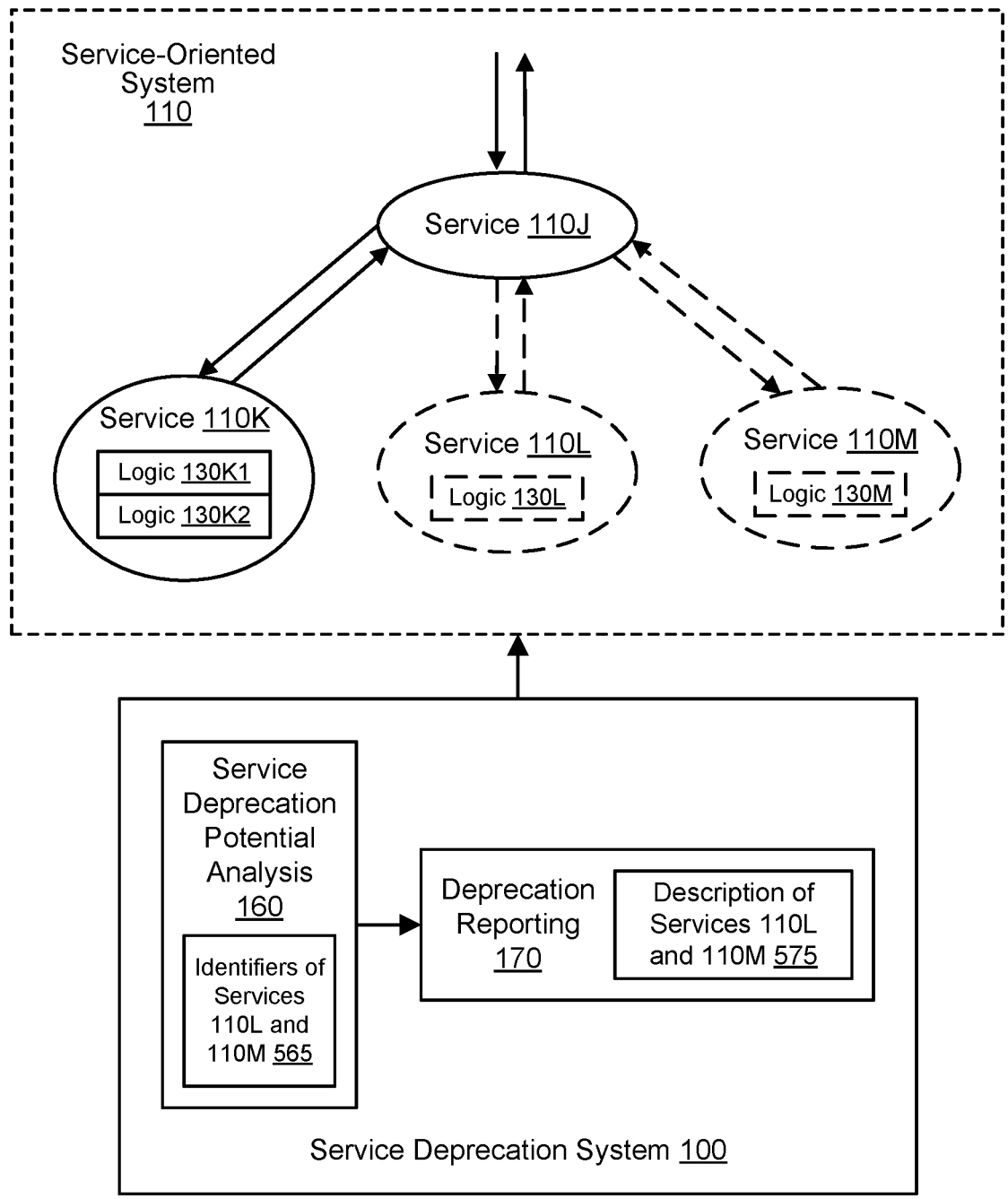

FIG. 5A, FIG. 5B, and FIG. 5C illustrate further aspects of the example system environment for automated deprecation analysis in a service-oriented system, including an example of deprecation analysis with service logic of a single service duplicated collectively by two other services, according to some embodiments. In the example call graph of FIG. 5A, a request may be provided to a service 110J, which may then call a downstream service 110K, a downstream service 110L, and a downstream service 110M.

Service 110K may implement service logic 130K1 and 130K2. Service 110L may implement service logic 130L. Service 110M may implement service logic 130M.

The service dependency analysis 140 may generate or obtain one or more dependency graphs 540 indicative of dependencies among the services 110J-110M as shown in FIG. 5A. The redundant logic analysis 150 may determine one or more indicators of redundant or duplicated logic among different services. As shown in FIG. 5A, the redundant logic analysis 150 may determine that logic 130K1 of service 110K is equivalent to logic 130L of service 110L. Additionally, the redundant logic analysis 150 may determine that logic 130K2 of service 110K is equivalent to logic 130M of service 110M. In one embodiment, duplicated logic 130K1 and 130L or duplicated logic 130K2 and 130M may be identified based (at least in part) on the corresponding services calling the same endpoint of another service with the same set of input parameters in their program code. In one embodiment, duplicated logic 130K1 and 130L or duplicated logic 130K2 and 130M may be identified based (at least in part) on the corresponding services having the same or similar access patterns in their program code, including the same order of service calls to an additional service.

Using results of the service dependency analysis 140 and results of the redundant logic analysis 150, the service deprecation potential analysis 160 may determine identifiers of one or more services or APIs that have redundant logic that could potentially be removed from the service-oriented system 110. As shown in FIG. 5A, the service deprecation potential analysis 160 may determine an identifier (e.g., a service name and/or other identifying metadata) 560 of the service 110K that has deprecation potential. Alternatively, as shown in FIG. 5C, the service deprecation potential analysis 160 may determine identifiers (e.g., service names and/or other identifying metadata) 565 of the services 110L and 110M that have deprecation potential.

As shown in FIG. 5B, deprecation reporting 170 may generate one or more reports, messages, or other human-readable data 570 descriptive of the service 110K found to have deprecation potential. Based (at least in part) on the deprecation reporting 170, one or more developers or service owners may choose to deprecate the service 110K whose logic 130K1 and 130K2 is duplicated by other services. Deprecation of the service 110K may represent a "retirement" of the service. Deprecation of the service 110K may include reassigning responsibilities of the deprecated service to one or more other services such as services 110L and 110M. Deprecation of the service 110K may include keeping the deprecated service in production but encouraging clients of the service to use the other services 110L and 110M instead of the deprecated service. Deprecation of the service 110K may include eventual removal of the deprecated service from the service-oriented system 100.

As shown in FIG. 5C, deprecation reporting 170 may generate one or more reports, messages, or other human-readable data 575 descriptive of the services 110L and 110M found to have deprecation potential. Based (at least in part) on the deprecation reporting 170, one or more developers or service owners may choose to deprecate the services 110L and 110M whose logic 130L and 130M is duplicated by the other service 110K. Deprecation of the service 110L or service 110M may represent a "retirement" of the service. Deprecation of the service 110L or service 110M may include reassigning responsibilities of the deprecated service to one or more other services such as service 110K. Deprecation of the service 110L or service 110M may include keeping the deprecated service in production but encouraging clients of the service to use the other services 110K instead of the deprecated service. Deprecation of the service 110L or service 110M may include eventual removal of the deprecated service from the service-oriented system 100.

Illustrative Computer System

In at least some embodiments, a computer system that implements a portion or all of one or more of the technologies described herein may include a computer system that includes or is configured to access one or more computer-readable media. FIG. 6 illustrates such a computing device 600. In the illustrated embodiment, computing device 600 includes one or more processors 610A-610N coupled to a system memory 620 via an input/output (I/O) interface 630. Computing device 600 further includes a network interface 640 coupled to I/O interface 630.

In various embodiments, computing device 600 may be a uniprocessor system including one processor or a multiprocessor system including several processors 610A-610N (e.g., two, four, eight, or another suitable number). Processors 610A-610N may include any suitable processors capable of executing instructions. For example, in various embodiments, processors 610A-610N may be processors implementing any of a variety of instruction set architectures (ISAs), such as the x86, PowerPC, SPARC, or MIPS ISAs, or any other suitable ISA. In multiprocessor systems, each of processors 610A-610N may commonly, but not necessarily, implement the same ISA.

System memory 620 may be configured to store program instructions and data accessible by processor(s) 610A-610N. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 620 as code (i.e., program instructions) 625 and data 626. In the illustrated embodiment, system memory 620 also stores program code and data that implement aspects of the service deprecation system 100 discussed above.

In one embodiment, I/O interface 630 may be configured to coordinate I/O traffic between processors 610A-610N, system memory 620, and any peripheral devices in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processors 610A-610N). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processors 610A-610N.

Network interface 640 may be configured to allow data to be exchanged between computing device 600 and other devices 660 attached to a network or networks 650. In various embodiments, network interface 640 may support communication via any suitable wired or wireless general data networks, such as types of Ethernet network, for example. Additionally, network interface 640 may support communication via telecommunications/telephony networks such as analog voice networks or digital fiber communications networks, via storage area networks such as Fibre Channel SANs, or via any other suitable type of network and/or protocol.

In some embodiments, system memory 620 may be one embodiment of a computer-readable (i.e., computer-accessible) medium configured to store program instructions and data as described above for implementing embodiments of the corresponding methods and apparatus. For example, system memory 620 may store program code and data associated with the system 100. In some embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 600 via I/O interface 630. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 600 as system memory 620 or another type of memory. Further, a computer-readable medium may include transmission media or signals such as electrical, electromagnetic, or digital signals, conveyed via a communication medium such as a network and/or a wireless link, such as may be implemented via network interface 640. Portions or all of multiple computing devices such as that illustrated in FIG. 6 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A computer-implemented method performed by one or more computing devices, comprising:
   determining that a particular service calls:
      a first service that implements a first portion and a second portion of first service logic,
      a second service that implements second service logic, and
      a third service that implements third service logic, wherein a service-oriented system comprises at least the particular service, the first service, the second service, and the third service;
   determining that the first portion of the first service logic is duplicated by the second service logic;
   determining that the second portion of the first service logic is duplicated by the third service logic; and
   based at least on the determining that the first portion of the first service logic is duplicated by the second service logic and the second portion of the first service logic is duplicated by the third service logic, removing the first service from the service-oriented system.

2. The method as recited in claim 1, further comprising:
   based on the determination that the first portion of the first service logic is duplicated by the second service logic, determine an identifier of the first service.

3. The method as recited in claim 2, wherein the identifier comprises one or more of a service name or other identifying metadata.

4. The method as recited in claim 1, further comprising:
   generating one or more messages descriptive of the first service.

5. The method as recited in claim 1, wherein determining that the first portion of the first service logic is duplicated by the second service logic is based at least on the first service and the second service calling a same endpoint of another service.

6. The method as recited in claim 5, wherein the first service and the second service call the same endpoint of the other service with the same set of input parameters.

7. The method as recited in claim 1, wherein determining that the first portion of the first service logic is duplicated by the second service logic is based at least on the first service and the second service having a same order of service calls to another service.

8. One or more non-transitory computer-accessible storage media storing program instructions that when executed on or across one or more processors cause the one or more processors to implement:
determine that a particular service calls:
a first service that implements a first portion and a second portion of first service logic,
a second service that implements second service logic, and
a third service that implements third service logic, wherein a service-oriented system comprises at least the particular service, the first service, the second service, and the third service;
determine that the first portion of the first service logic is duplicated by the second service logic;
determine that the second portion of the first service logic is duplicated by the third service logic; and
based at least on the determining that the first portion of the first service logic is duplicated by the second service logic and the second portion of the first service logic is duplicated by the third service logic, remove the second service and the third service from the service-oriented system.

9. The one or more storage media as recited in claim 8, wherein the program instructions when executed on or across the one or more processors cause the one or more processors to:
based on the determination that the first portion of the first service logic is duplicated by the second service logic, determine an identifier of the first service.

10. The one or more storage media as recited in claim 8, wherein the program instructions when executed on or across the one or more processors cause the one or more processors to:
based on the determination that the second portion of the first service logic is duplicated by the third service logic, determine an identifier of the first service.

11. The one or more storage media as recited in claim 8, wherein to determine that the first portion of the first service logic is duplicated by the second service logic, the program instructions when executed on or across the one or more processors cause the one or more processors to:
determine that the first service and the second service call a same endpoint of another service.

12. The one or more storage media as recited in claim 8, wherein the program instructions when executed on or across the one or more processors further cause the one or more processors to:
generate a report descriptive of the second service and the third service.

13. The one or more storage media as recited in claim 8, wherein to determine that the first portion of the first service logic is duplicated by the second service logic, the program instructions when executed on or across the one or more processors cause the one or more processors to:
determine that the first service and the second service having a same order of service calls to another service.

14. A system, comprising:
one or more processors and one or more memories that store computer-executable instructions that, when executed, cause the one or more processors to:
determine that a first service implements first service logic and calls another service in a service-oriented system and a second service implements second service logic and also calls the other service;
determine that the first service logic of the first service is duplicated by the second service logic of the second service; and
based at least on the determination that the first service logic of the first service is duplicated by the second service logic of the second service:
modify the other service such that the other service implements the first service logic,
remove or deprecate the first service logic from the first service, and
remove or deprecate the second service logic from the second service.

15. The system as recited in claim 14, wherein to determine that the first service logic of the first service is duplicated by the second service logic of the second service, the instructions cause the one or more processors to identify the first service and the second service as calling a same endpoint of the other service.

16. The system as recited in claim 15, wherein to determine that the first service logic of the first service is duplicated by the second service logic of the second service, the instructions further cause the one or more processors to identify the first service and the second service as calling the same endpoint of the other service with a same set of input parameters.

17. The system as recited in claim 14, wherein to determine that the first service logic of the first service is duplicated by the second service logic of the second service, the instructions cause the one or more processors to identify the first service and the second service as having a same access pattern, wherein the same access pattern comprises an order of service calls to the other service.

18. The system as recited in claim 14, wherein the one or more memories store additional computer-executable instructions that, when executed, cause the one or more processors to perform:
implement, by the other service, the first service logic using an application programming interface of the other service.

19. The system as recited in claim 14, wherein the one or more memories store additional computer-executable instructions that, when executed, cause the one or more processors to perform:
subsequent to seeking approval from a developer or owner associated with the other service, modify the other service such that the other service implements the first service logic.

20. The system as recited in claim 14, wherein the one or more memories store additional computer-executable instructions that, when executed, cause the one or more processors to perform:
generate a report descriptive of the first service logic and the second service logic having deprecation potential.

* * * * *